United States Patent [19]

Uchiumi

[11] Patent Number: 5,225,946
[45] Date of Patent: Jul. 6, 1993

[54] INFORMATION RECORDING/REPRODUCING APPARATUS FOR REPRODUCING A PORTION OF A PICTURE SIGNAL DURING A FAST FEEDING/REWINDING OPERATION

[75] Inventor: Satoshi Uchiumi, Saitama, Japan

[73] Assignee: Pioneer Electronic Corporation, Tokyo, Japan

[21] Appl. No.: 478,389

[22] Filed: Feb. 12, 1990

[30] Foreign Application Priority Data

Feb. 20, 1989 [JP] Japan .................................. 1-39614

[51] Int. Cl.⁵ ............................................. G11B 15/18
[52] U.S. Cl. .................................. 360/72.1; 360/10.3; 360/35.1
[58] Field of Search ................ 360/10.3, 14.1, 14.2, 360/72.1, 72.2, 33.1, 35.1; 358/310, 311, 312, 335

[56] References Cited

U.S. PATENT DOCUMENTS

| | | | |
|---|---|---|---|
| 4,290,081 | 9/1981 | Foerster | 360/10.3 X |
| 4,339,775 | 7/1982 | Lemke et al. | 360/10.3 |
| 5,130,860 | 7/1992 | Nagashima et al. | 360/19.1 |

*Primary Examiner*—Andrew L. Sniezek
*Attorney, Agent, or Firm*—Sughrue, Mion, Zinn, Macpeak & Seas

[57] ABSTRACT

A rotary video head type information recording/reproducing apparatus in which a video tape runs while being in contact with a stationary head at the time of fast-feeding/rewinding of the video tape. In recording/reproducing operation of the information recording/reproducing apparatus, a one-scene picture is extracted at intervals of a predetermined period from a picture signal and the extracted picture is recorded on the video tape by the stationary head in synchronism with the picture signal. When it is desired to perform a picture search, a still picture which changes at intervals of the predetermined period can be reproduced on a picture screen of a display only by performing the fast-feeding/rewinding operation. Accordingly, an operator can perform search for a desired picture at a high speed by referring to the timing of change of the still picture actually displayed on the picture screen.

9 Claims, 8 Drawing Sheets

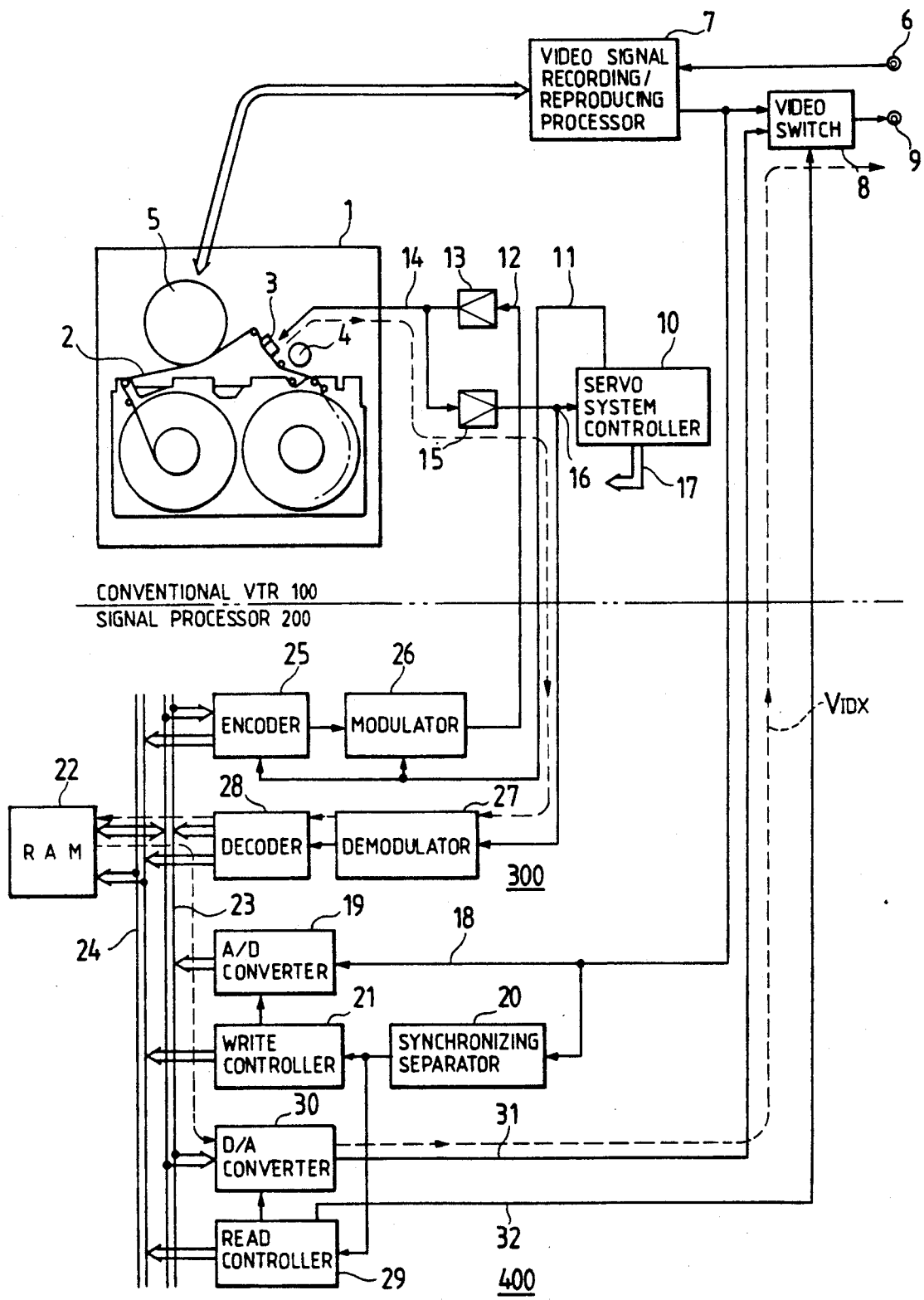

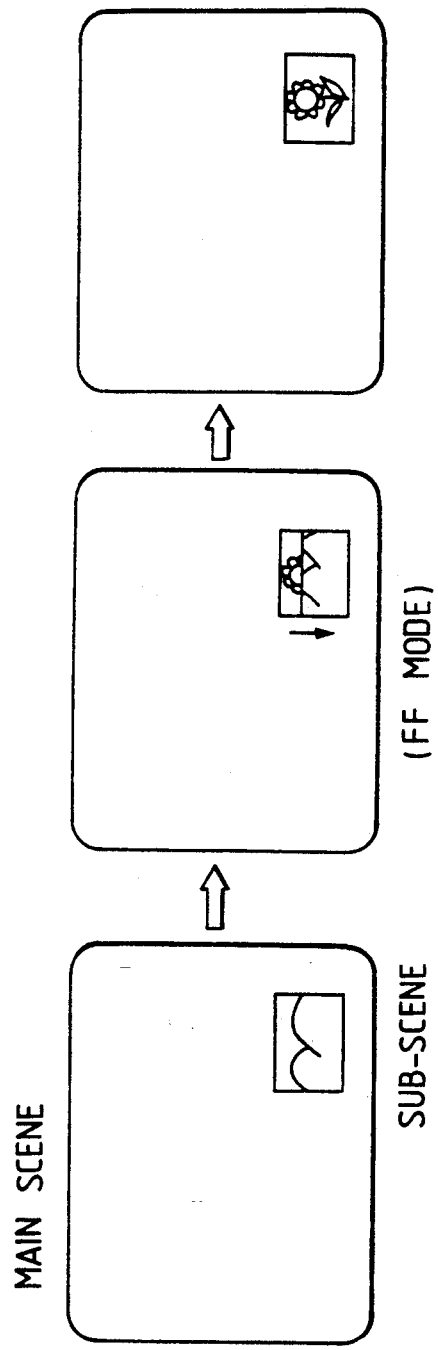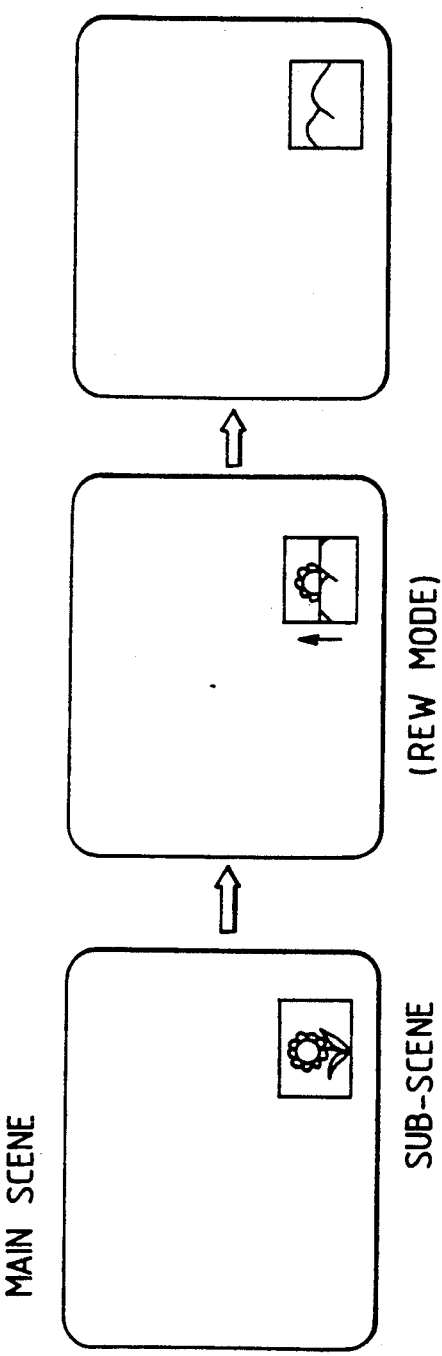

INFORMATION RECORDING/REPRODUCING APPARATUS FOR REPRODUCING A PORTION OF A PICTURE SIGNAL DURING A FAST FEEDING/REWINDING OPERATION

BACKGROUND OF THE INVENTION

The present invention relates to an information recording/reproducing apparatus such as a video tape recorder (hereinafter abbreviated as "VTR"), and more particularly, relates to an information recording/reproducing apparatus suitable for video searching (hereinafter abbreviated as "SEARCH") in the fast feeding (hereinafter abbreviated as "FF") or rewinding (hereinafter abbreviated as "REW") of a magnetic recording medium (hereinafter referred to as "video tape").

VTRs use long and continuous video tapes as a recording medium, so that recording can be continued for a long time of 6 hours or more. However, VTRs have a problem that a long time is required for searching a desired scene recorded on the video tape and that the exact position of the scene cannot be found easily. The problem is caused by the fact that recording information is recorded on a video tape serially in the direction of running of the video tape on the whole. Accordingly, the video tape must be fed till the desired scene appears. In such VTRs, main examples of searching systems which have been put into practice are (1) a tape counter system, (2) a cue review system, and (3) an index/address system. In the following, the respective systems are described in brief.

[1] Tape Counter System

This system comprises counting the quantity of running of a video tape by a counter to indicate the count value of the counter as the quantity of time. An operator feeds rapidly or rewinds the video tape by reference to the indicated count value to search a desired scene.

However, the time indicated by the count value is relative time on the tape though the indication has been improved in recent years to obtain information of hour, minute and second. Accordingly, a series of procedures of rewinding the tape to the top thereof once, resetting the counter, memorizing the count value of the counter at the position of the starting of the desired program and feeding the tape rapidly to the position of the starting of the desired program is required.

[2] Cue Review System

This system comprises reproducing a picture while making the video tape running at a relatively high speed in a state where the tape is wound on a rotary drum to thereby search a desired reproduction scene.

However, the rotation number of the rotary drum (that is, the vertical synchronizing period of the reproducing video signal) must be deviated in order to keep the speed of the tape almost constant relative to a rotary head. Accordingly, the speed of the tape is limited to secure the synchronism of a television receiver set. Though the system is convenient for skipping a relatively short portion such as a commercial message portion or the like, a long time is required for searching a long distance. For example, in the case where the deviation of the vertical synchronizing period is limited within the range of ±5% in variable-speed reproduction of the video tape recorded in the VHS-type standard mode, the searching speed is limited to an about 9-fold speed. In practice, the time of 13 minutes or more is required for searching the whole of the tape having the capacity of 2 hours. Further, repeating the high-speed running of the video tape in the state where the tape is wound on the rotary drum, causes deposition of magnetic powder of the video tape on the video head.

[3] Index/Address System

This system uses a control signal (hereinafter referred to as "CTL signal") for reproduction tracking. In short, in the case of the VHS type, the index for marking or the address for addressing can be superposed on the CTL signal by giving a change to the duty ratio of the CTL signal. Therefore, the high-seed searching of the 2-hour tape is finished in about 3 minutes by constituting the tape running mechanism so that the tape runs in a state where the tape is in contact with the CTL stationary head at the time of FF/REW.

Although this system has an advantage in that searching can be made based on a numerical value simpler than that of the tape counter system (1), the index expresses merely the relative address between picture informations and the address expresses merely the value of absolute address. Accordingly, what scene is recorded at the position cannot be known. Accordingly, to know the obvious correlation between the index/address and the picture, a note described by the operator or the memory of the operator is required.

In general, the index is used to be marked only at the time of the starting of a television program, for example, at the point of the starting of recording. As a result, only one index is marked automatically in the top portion (hereinafter referred to as "tape top") of the video tape in the case where a long-hour television program is recorded. If a new index is not marked by a manual operation, the function of the index is no good use. If an index is marked at a suitable position, a scene to be searched must be designated by a numerical value (address) with no correlation with a picture. Accordingly, a sense of irrelevancy on the operation is not yet eliminated. To improve the disadvantage, the following applied example has been proposed. [3-1] Index Scanning Reproducing System According to this system, high-speed searching of an index is performed while performing high-speed running of the video tape through the FF/REW operation, the tape running mechanism is switched to the reproducing mode to obtain an ordinary running speed when the index is detected, and a picture is reproduced only for several seconds to search the picture exactly corresponding to the index. Then, after the reproduction for several seconds, the apparatus is switched again to the "FF/REW" mode to search the next index.

However, this system has a disadvantage in that the switching operation of the tape running mechanism is required to reduce the searching speed because the tape running mechanism is switched in the course of searching. [3-2] Multi-Index Systems According to this system, scale-down scenes are formed from pictures at the respective positions where multiple index data are marked, and multi-screen data (for example, 4×4=16 screens) are produced to make it possible to reproduce the scale-down scenes simultaneously on one CRT display. When the tape top portion is reproduced at the time of reproducing after the multi-screen data thus produced are after-recorded in the tape top portion, index data contained in the video tape and pictures corresponding to the index data as guide information are obtained from the CRT display.

However, this system has problems in that the video tape must be rewound to the tape top before searching and in that the number of index data which can be indicated on one display is limited to thereby make fine searching impossible.

The aforementioned searching systems have both merits and demerits. If attention is given to the attempt to perform picture searching by the signal processing of the VTR without complex operation conducted by the operator, there is room for improvement in the index system [3].

However, the index system has various disadvantages as described above. The first disadvantage is that a special index marking means such as a manual index marking means are required for using the index signal effectively to make relatively fine searching possible. The second disadvantage is that correlation between the index and the picture existing at the position where the index is marked is difficult, because the address of the index must be designated by a numerical value in the searching operation. The third disadvantage is that the middle position between index data cannot be searched because pictures between the index data are skipped when searching is executed. The fourth disadvantage is that the system cannot answer some vague and sensory requirement, for example, "where an interesting picture exists in the video tape" caused by the fact that the index must be designated by a numerical value and by the fact that the correlation between the index and the picture cannot be grasped as an obvious image.

SUMMARY OF THE INVENTION

It is therefore an object of the present invention to provide an information recording/reproducing apparatus in which the index system is employed as a precondition and in which a desired picture can be searched at a high speed only by FF/REW operation with no complex searching operation for designation of the address.

In order to attain the above object, according to an aspect of the present invention, the rotary video head type information recording/reproducing apparatus in which a video tape runs while being in contact with a stationary head at the time of fast-feeding/rewinding of the video tape, comprises: a read/write memory for storing a picture signal for at least one scene; a recording control circuit for digitizing at least one-scene picture signal contained in a recording/reproducing picture signal at a predetermined period so as to write the digitized one-scene picture signal into the memory and for reading data of one-scene picture signal written in the memory so as to record the data on the video tape through the stationary head, in recording/reproducing operation of the information recording/reproducing apparatus; and a reproducing control circuit for reproducing data of one-scene picture signal from the video tape through the stationary head and for converting the reproduced data into analog data so as to output the analog data.

The information recording/reproducing apparatus according to the present invention operates in a manner as follows. In the recording/reproducing operation mode of the information recording/reproducing apparatus, the recording control circuit digitizes at least one-scene picture signal contained in a recording/reproducing picture signal at a predetermined period and writes the digitized one-scene picture signal into the memory, and then the recording control circuit reads out one-scene picture signal from the memory and records on the video tape through the stationary head. The recording position in the video tape is a control track or an audio track with which the stationary head is in contact. The above processing is executed at intervals of the above-mentioned predetermined period with which each one-scene picture is digitized.

Accordingly, picture signals for respective one-scene pictures corresponding to index points at intervals of the above-mentioned predetermined period are successively recorded in time series on the video tape.

In order to perform picture searching in the FF/REW operation mode, the reproducing control circuit reproduces the previously recorded one-scene picture signal from the video tape through the stationary head and converts the reproduced data into analog data so as to output the analog data. Although the contents of the one-scene picture signal outputted at this time change at intervals of the above-mentioned predetermined period, the same one-scene picture continues without changing for each interval of the above-mentioned predetermined period and therefore the picture obtained on a picture screen such as a CRT or the like is a still picture.

In summary, in picture recording/reproducing, a one-scene picture is extracted at intervals of a predetermined period from a picture signal and the extracted one-scene picture is recorded on a video tape in synchronism with the picture signal, so that when it is desired to perform picture search, a still picture which changes at intervals of the predetermined period can be reproduced on a picture screen of a display only by performing FF/REW operation. Accordingly, an operator can perform search for a desired picture at a high speed by referring to the timing of change of the still picture actually displayed on the picture screen.

BRIEF DESCRIPTION OF THE DRAWINGS

Other features and advantages of the present invention will be apparent from the following description taken in connection with the accompanying drawings, wherein:

FIG. 9 is a block diagram for explaining the operation at the time of the FF/REW-PLAY operation;

FIG. 10 is a diagram for explaining the state of display at the time of FF-PLAY; and FIG. 11 is a diagram for explaining the state of display at the time of REC-PLAY.

DETAILED DESCRIPTION OF THE PREFERRED EMBODIMENTS

Referring to the accompanying drawings, preferred embodiments of the present invention will be described hereunder.

To facilitate the understanding for readers, the contents of the disclosure will be listed first.

FIRST EMBODIMENT

Preconditions
Common Constituent Parts between the Conventional VTR
and the First Embodiment of the Invention
Constitution of the First Embodiment of the Invention
Recording Format
Reduced-Scale Display
Operation
Circumstances in Practical Use

SECOND EMBODIMENT

Applied Example

First Embodiment

Figure 1:
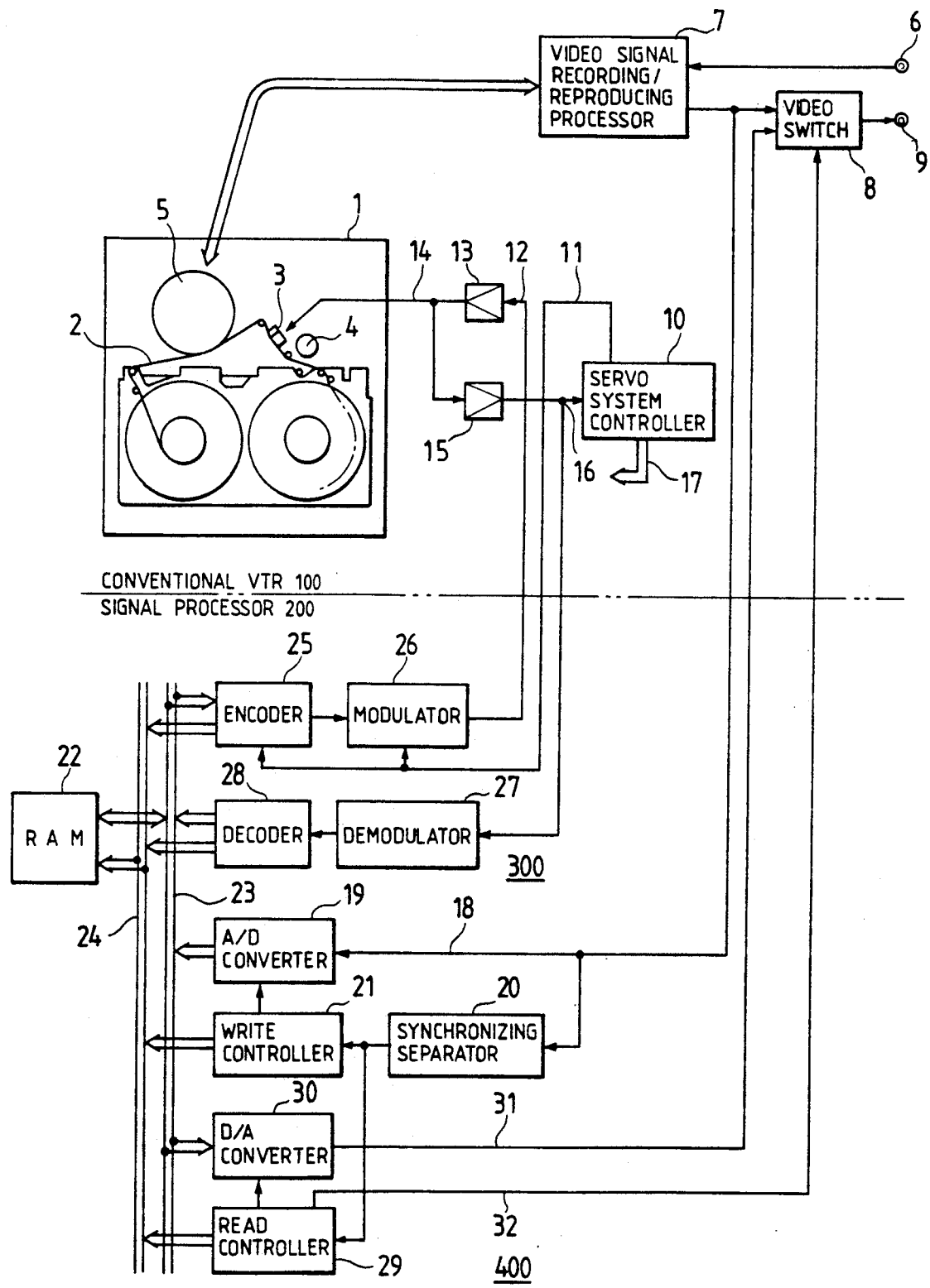
FIG. 1 is a block diagram showing a first embodiment according to the present invention.

FIG. 1 shows a first embodiment of the present invention.

The preconditions will be now described hereunder.

This embodiment can be constituted by adding a signal processing circuit 200 according to this invention to a conventional VTR 100, on the preconditions that a video tape 2 runs while being in contact with both a rotary head mechanism 5 and a stationary head 3 in the recording/reproducing mode of the conventional VTR 100 and that the stationary head 3 is in contact with the video tape 2 in the FF/REW mode. In brief, this reason why such preconditions are required depends on the fact that the index scene for picture searching is recorded in the control track or audio track of the video tape 2 through the stationary head 3. The reason will be apparent more in detail from the description which will be made later.

When the aforementioned conditions are applied to the recording/reproducing systems of real VTRs, β type VTRs satisfy the conditions. In the case of 8-mm video type VTRs, the stationary head is not essential but the linear track of the tape can be used. In the case of VHS type VTRs, a tape running mechanism for performing fast feeding and rewinding in the state of the video tape 2 of so-called "half loading" in which the stationary head 3 alone is in contact with the video tape 2 for the purpose of index searching, is employed. Accordingly, the present invention can be applied to the VHS type VTRs.

In the following, the construction of the embodiment according to the present invention will be described.

In FIG. 1, the VTR is divided broadly into two constituent groups, namely, the conventional VTR 100 and the signal processing circuit 200 according to the present invention.

The conventional VTR 100 has a VTR mechanism 1 for FF/REW running of the video tape 2 in a "half loading" state, a stationary head (hereinafter referred to as "CTL head") 3 being constantly in contact with a control track of the video tape 2, a pinch roller 4 for feeding the video tape 2, the pinch roller being not in contact with the video tape 2 at the time of the FF/REW, a rotary head mechanism 5, a video signal input terminal 6, a video signal recording/reproducing processing circuit 7, a video signal output terminal 9, a servo system control portion 10 for the VTR mechanism 1, a CTL recording amplifier 13 for recording a CTL signal for tracking, a connection cable 14 for connecting the CTL recording amplifier 13 to the stationary head 3, a CTL reproducing amplifier 15, a group of control signals generated from the servo system control portion 10, and other parts (not shown) such as an audio recording/reproducing circuit, a tuner circuit, a timer reservation circuit, and so on.

For the provision of the signal processing circuit 200, the conventional VTR 100 is additionally provided with a video switch 8 for switching between a video signal 18 as an output signal of the video signal recording/reproducing processing circuit 7 and a D/A converter output signal 31 on the basis of the control of a switching control signal 32, a CTL signal 12 subjected to necessary modulation based on the recording CTL signal 11 from the servo system control portion 10, the CTL signal 12 being fed to the CTL recording amplifier 13, and a reproducing CTL signal 16 being fed to a demodulator portion 27.

The signal processing circuit 200 is constituted by an RAM (having a capacity for one frame/field) 22 serving as a memory capable of reading/writing a one-scene video signal (hereinafter referred to as "index video signal $V_{IDX}$" for discrimination from the video signal 18) suitably selected from the video signal 18, a recording control circuit 300 for performing control on the recording of the index video signal $V_{IDX}$, and a reproducing control circuit 400 for performing control on the reproducing of the index video signal $V_{IDX}$ at the time of searching.

The recording control circuit 300 is constituted by an A/D converter portion 19 for converting the video signal 18 as an output signal of the video signal recording/reproducing processing circuit 7 into a digital signal, a synchronizing separation circuit 20 for separating horizontal and vertical synchronizing signals from the video signal 18, a writing control circuit 21 for controlling the A/D converter portion 19 on the basis of the synchronizing signals to thereby determine the address of the digital data, a data bus line, an encoder portion 25 for encoding picture data stored on the RAM 22 according to a predetermined format, and a modulator portion 26 for modulating the CTL recording signal based on the encoded data. The recording format of the index video signal $V_{IDX}$ to the video tape 2 by the encoder portion 25 will be described later.

The reproducing control circuit 400 is constituted by a demodulator circuit 27 for demodulating data from the reproducing CTL signal 16, a decoder portion 28 for reconstructing picture data from the demodulated data and for correcting or compensating the picture data, a reading control portion 29 for performing RAM control and video switch control for the purpose of display based on the synchronizing signals, a D/A converter portion 30 for converting the picture data into an analog video signal, a D/A converter output signal 31 as an output signal (that is, reproducing index video signal) of the D/A converter portion 30, and a switching control signal 32 for switching over the video switch 8 to send the D/A converter output signal to a video signal output terminal 9. The form of display (reduced-scale display) of the D/A converter output signal 31 fed from the video signal output terminal 9 to a CRT screen not shown will be described later.

In the aforementioned configuration, the block diagram shown in FIG. 1 expresses the connection of a signal processing. In practice, the aforementioned constituent parts can be controlled by a micro-processor (micro-computer). The total operation control on the encoder portion 28, the modulator portion 26, the demodulator portion 27 and other signal processing portions not shown can be constituted without discrete logic processing and analog processing.

Although this embodiment has shown the case where the CTL signal is used among recording signals in use of the stationary head 3, the present invention is applicable to the case where an audio track or the like may be used.

In the following, "recording format" is described.

In the case where a picture is recorded after being digitized, the following items are important for the formats (in which still picture display will be described).

(1) Quantizing Method: picture element constitution and bit number per picture element.

(2) Encoding Method: interleave, error detection/correction code, compensating system, high-efficient encoding.

(3) Modulating Method: transmission rate, error rate, band compression.

In this embodiment, preconditions for determining these formats are decided as follows.

(a) Index video signal $V_{IDX}$ data are recorded on a control track. Therefore, no influence on tracking as an original object of CTL is required. Further, no mistake for index/address information is required.

(b) The recording of one scene of the index video signal $V_{IDX}$ must be finished just in five minutes. Assuming that FF/REW is at a 50-fold speed, the updating period is 6 seconds. In the case where a recording is made in a 3-fold mode, the updating period is 2 seconds because the speed of FF/REW corresponds to a 150-fold speed.

(1) Quantizing Method

From the precondition (b), all one-scene index video signal $V_{IDX}$ data and additional data must be recorded in 5 minutes × 60 seconds × 30 frames per second = 9000 frames.

As well known, one wave of the CTL signal is recorded in one frame. Assuming that data is added in the form of modulation of the duty ratio of the CTL signal, one-scene index video signal $V_{IDX}$ data must be in the range of 9000 bits. Further, additional data other than the picture data, such as synchronizing bit for expressing a data block, address for the address of the data block, error detection code, and the like, must be contained in the recording data. Therefore, picture data are established to be about 8000 bits. Assuming that one picture element is composed of 4 bits (16 tone steps, monochrome), 2000 picture elements can be provided. In this embodiment, 44 (picture elements per line) × 45 (lines) = 1980 picture elements are provided.

4 bits × 1980 = 7920 bits

The RAM 22 in FIG. 1 may be constituted by a 2 kw × 4 bits memory element.

(2) Encoding Method

It is general that the total transmission bit number = 9000 is divided into blocks having a suitable length and that additional data, such as block synchronizing signal, block address, error detection/correction code, and the like, are added to each block. In this embodiment, 45 blocks per line are provided. Accordingly, the bit number of one block is represented by the equation: 9000 bits ÷ 45 = 200 bits per block.

Figure 2:
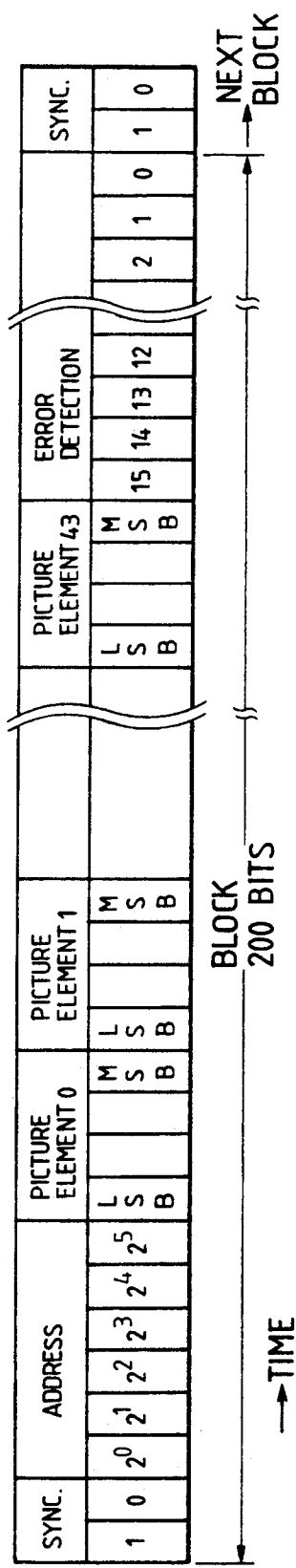
FIG. 2 is a diagram for explaining the recording format according to the present invention.

Of the 200 bits, the bit number of the picture data is represented by the equation: 44 × 4 = 176 bits. The bits which can be added are 24. When block address is added to each block, 6 bits are required. If 2 bits of the residual 18 bits are used for block synchronization, 16 bits can be used for error detection/correction. The recording data thus formed in order are shown in FIG. 2.

Two bits of synchronizing data are placed in the lead of the block and are discriminated from other data by changing the modulating system. Six bits of address data are binary-coded and the value thereof increases by one for each block to take the range of from 0 to 44 (45 lines). Each picture element data is composed of 4 bits, so that 44 picture elements of the line designated by the block address are given in order. Sixteen bits of error-detecting or correcting code such as CRC produced by a predetermined formula are given lastly so that the total number becomes 200.

In this embodiment, encoding techniques are described, inclusive of quantizing techniques but exclusive of high-efficient techniques.

(3) Modulating Method

For example, in a VHS-type VTR, it is not preferable that an audio signal recording system through the stationary head is used for other purposes, because no frequency-modulated Hi-Fi audio signal may be recorded. Therefore, in this embodiment, multiple modulation is made on the CTL signal 12.

Figure 3:
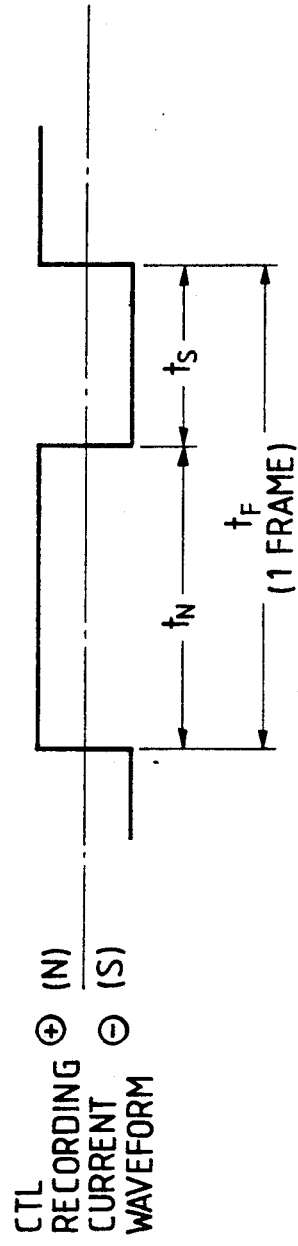
FIG. 3 is a diagram for explaining the CTL current waveform.

As well known, the leading edge (the point in which the remanence on the tape is changed from S to N) of the CTL recording current as shown in FIG. 3 is necessary for reproducing tracking which is an original object of the CTL signal 12. On the other hand, the position of the trailing edge (the point in which the remanence on the tape is changed from N to S) is not limited. In other words, duty ratio (= tN/tF) is not limited.

As described preliminarily in the prior art, searching by superposing index or address information on the CTL signal 12 has been used in practice in recent years. As well known, the duty ratio may be divided into two ranges to express two digital data "1" and "0".

Data "0" → duty ratio 60 ± 5%
Data "1" → duty ratio 27.5 ± 2.5%

Figure 4:
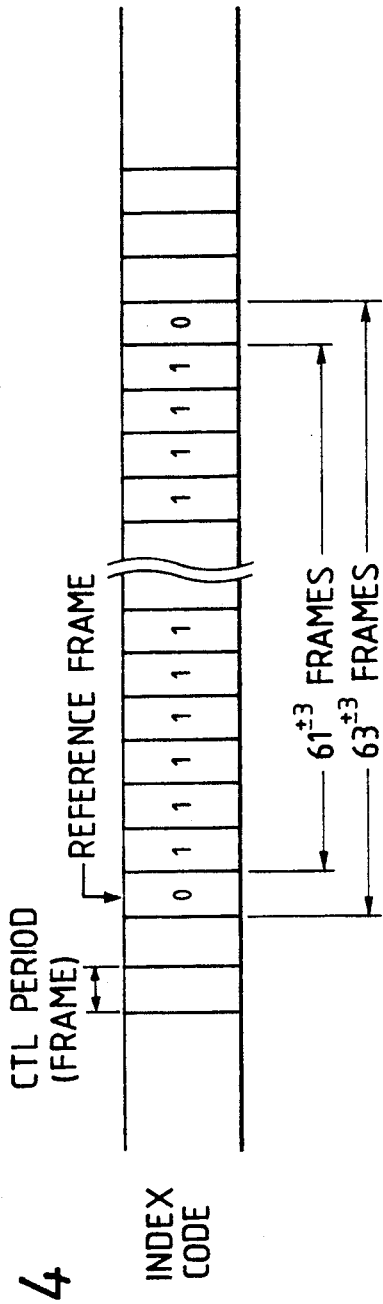
FIG. 4 is a diagram for explaining the construction of data in the index code.
Figure 5:
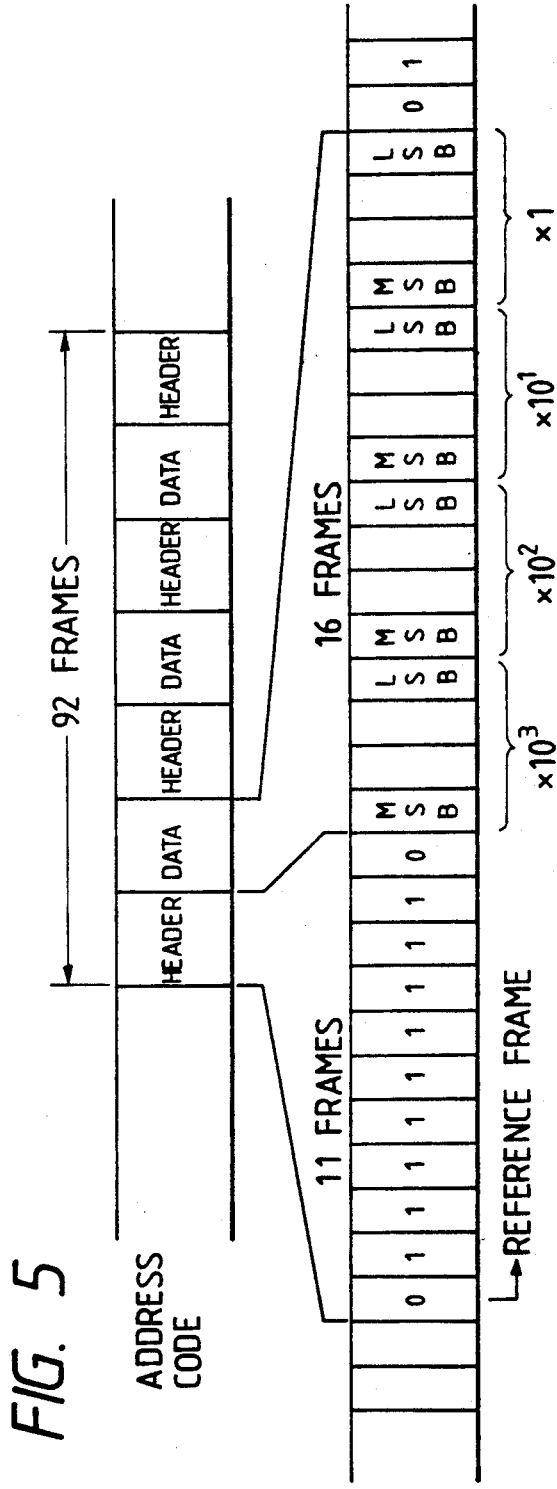
FIG. 5 is a diagram for explaining the construction of data in the address code.

The index code and the address code are effectuated in combinations of data "0" and "1" as shown in FIGS. 4 and 5. Accordingly, there is no mistake if data are out of the two duty ratio range. Further, there is no mistake if eight or less CTL signals having the duty ratio corresponding to the data "1" are continuous.

For this reason, duty ratios in modulation in this embodiment are established as follows.

Data "0" → duty ratio 55%
Data "1" → duty ratio 75%
Sync "0" → duty ratio 75%
Sync "1" → duty ratio 27.5%

Although 27.5% duty ratio corresponding to the aforementioned index data "1" is also used in synchronizing in this invention, there is no mistake because the synchronizing data is only one for 200 frames.

In the following, reduced-scale display is described.

In this embodiment, the number of picture elements per one scene is established to be low, because nothing but very low transmission rate of 1 bit per 1 frame (that is, 30 b/s) can be obtained for the reason that superposing is made on the CTL signal. (44×45=1980 picture elements)

In the case where a still picture consisting of 1980 picture elements is inserted in the video signal 18 at the time of FF/REW, a display area having size vertically and horizontally reduced to about 1/5 of the TV screen can be obtained by assigning 45 lines of the still picture to 45 lines (vertical direction) of the video signal 18 and assigning one line (44 picture elements) of the still picture to about 10 μs of the horizontal synchronizing signal of the video signal 18. The reduction rate of the practical picture size is set to be less than the reduction rate of the display size. In short, the reduction rate of the practical picture size is set to be ¼ of the TV screen size. The original picture at the time of recording is cut out so that the center portion of the original picture is quantized. Accordingly, the contents of the still picture is made easy to see though the display size is small.

In respect to the horizontal direction, 44 picture elements are sampled in a period of 0.91 μs (1.1 MHz). This sampling frequency (1.1 MHz) is 70 times as high as the horizontal scanning frequency $f_H$. The center portion of the picture signal of 0.91×44=40 μs is sampled from the picture signal of about 52 μs in the horizontal direction. When the sampled signal is displayed at the time of FF/REW, D/A conversion is made in the frequency of 4.4 MHz (280×$f_H$) which is four times as high as the ordinary sampling frequency. In short, reduced-scale display is made in a period of 10 μs in the horizontal direction.

Figure 6A:
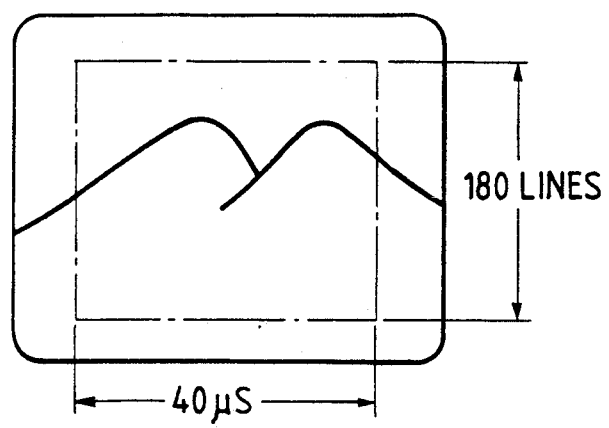
FIG. 6(a) is a diagram for explaining the form of original picture display of the index video signal at the time of recording.

In respect to the vertical direction, one line is sampled in a period of 4 lines. Although about 220 effective scanning lines exist in the vertical direction, one line is sampled for every three lines on the center portion thereof having 4×45=180 lines. In the case where the signal is displayed at the time of FF/REW, the sampled signal is sent to each H (45 lines) with a suitable line of the video signal 18 output picture as a starting line. Accordingly, at the time of display, the original picture of 180 lines is scaled down to the scale of 45 lines which is ¼ as much as the original scale of 180 lines. Consequently, an original picture shown in FIG. 6(a) is scaled down to a reduced-scale picture shown in FIG. 6(b).

The reduced-scale display is a known system called "picture-in-picture". In the display according to the present invention, the reduced-scale screen is constituted by one-field still picture. Accordingly, the same reduced-scale still picture can be inserted in each field without discrimination between even and uneven fields of the video signal 18 picture.

First, the operation (hereinafter referred to as "REC-REC") of recording the index video signal $V_{IDX}$ in the recording mode of the VTR is described.

Figure 7:
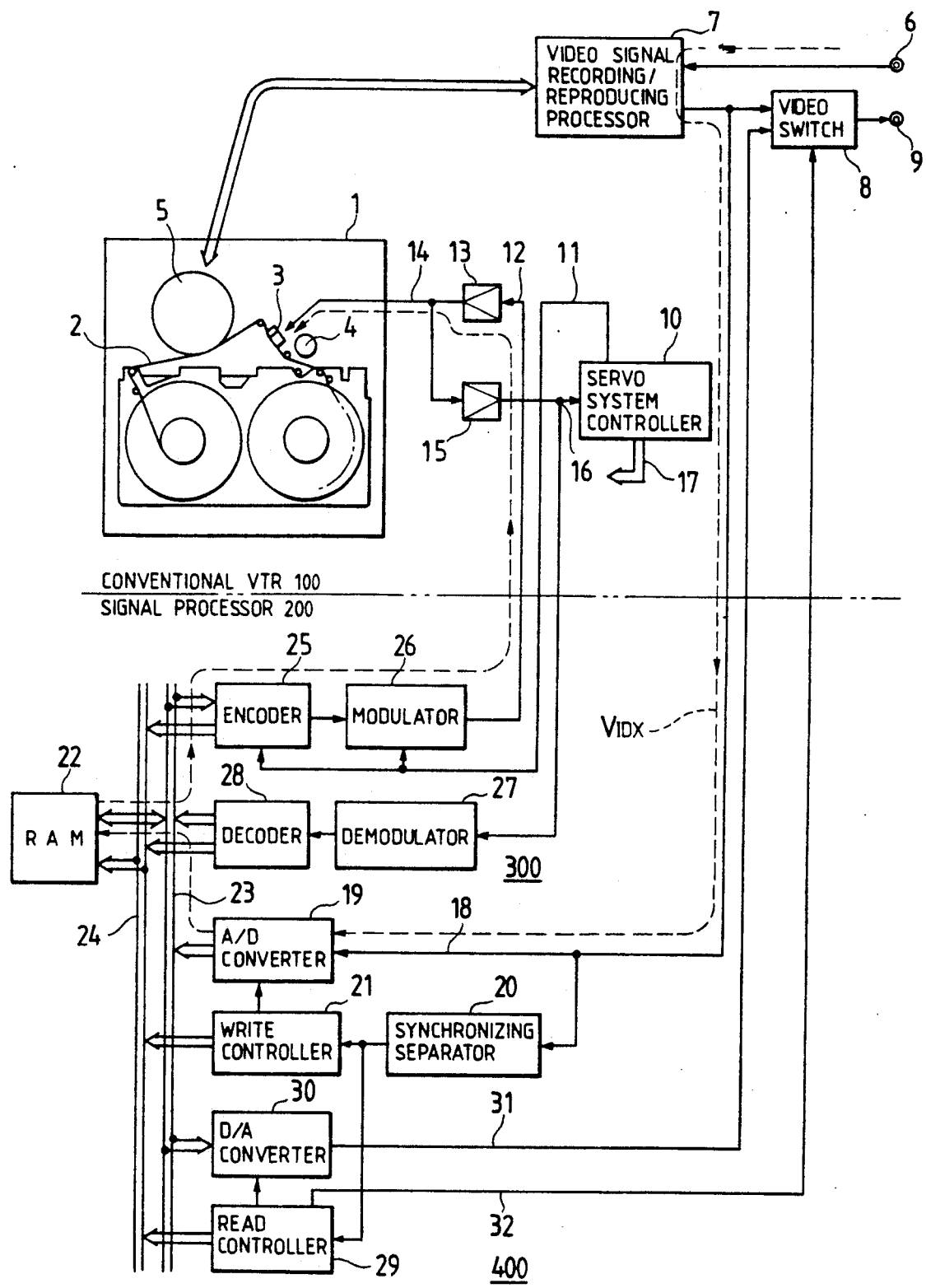
FIG. 7 is a block diagram for explaining the operation at the time of the REC-REC operation.

Here, the outline of the operation is described to assist the understanding of the readers. The outline of the flow of main signals at the time of the "REC-REC" operation is shown in FIG. 7. As shown in FIG. 7, the video signal received from the video signal input terminal 6 is sent as a through output from the video signal recording/reproducing processing circuit 7 to the video switch 8 and then branched as a video signal 18 to the A/D converter portion 19. Data of the video signal 18 digitally coded by the A/D converter portion 19 are once stored in the RAM 22 through the data bus line 23. Then, the data of the video signal 18 are read from the RAM 22 and encoded in a predetermined format by the encoder portion 25 through the data bus line 23. The encoded data are modulated by the modulator portion 26. After the modulated data is superposed on the CTL signal 12, the data are passed through the CTL recording amplifier 13 and the connection cable 14 and recorded on the control track of the video tape 2 through the stationary head 3.

In the following, the "REC-REC" operation is described more in detail.

The consideration that the recording of the conventional index address information is not impeded is required for recording the index video signal $V_{IDX}$. Therefore, the control portion generalizing the signal processing portion not shown after receiving the fact that the VTR portion is in the recording mode (hereinafter referred to as "REC") judges whether index information (duty ratio=27.5%) is superposed on the recording CTL signal from the VTR portion or not. Index information is generally designed to be automatically given to the starting point of the REC, so that, in most cases, the judgment becomes valid. The judgment is made in the encoder portion 25. If 27.5% duty ratio is produced even in one frame, the recording CTL signal 11 is sent as a CTL signal 12 with no change of the duty ratio. The recording CTL, signal is held longer (93 frames or more) than the time required for the index and address codes. If 27.5% duty ratio is given during the superposing of the picture data which will be described later, the picture data superposing process is interrupted for the period of 93 frames to send the recording CTL signal 11 as a through output to the CTL signal 12. Accordingly, there is no bad influence on the recording of the index and address information of the conventional VTR.

In the case where the recording CTL signal 11 input is out of the index and address codes, the output video signal 18 of the video signal recording/reproducing processing circuit 7 is digitally converted after the frequency is limited to the band which is about half as high as the AD conversion clock frequency. The digital data thus obtained are passed through the digital data bus line and then stored in the RAM. The AD conversion data from the A/D converter portion 19 are stored in the RAM 22 by 44 samples per one line for every three lines on the basis of the synchronizing signal separated by the synchronizing separation circuit 20. This is perfected if one-field data are stored. The writing control circuit 21 serves to control this operation. The circuit 21 starts the counting of signal pulses from the vertical synchronizing signal of the field to be stored, for example, counts signal pulses in 70×$f_H$ from the horizontal synchronizing signal of the 46th line till data in 44 clock pulses from the 18th clock to the 63th clock are stored in the RAM 22. The addresses in the RAM are 0 to 43. Next, 44 picture elements in the 50th line are sampled in the same manner as described above, so that data are respectively stored in the addresses 44 to 87 of the RAM. When this operation is lastly made about the 222nd line, the storage of one-scene data of 45 lines is perfected. The RAM address of the last data is 1979. Data of 4 bits forming one picture element are stored in each RAM address. In short, data processing on the are a surrounded by the dot-and-dash line in FIG. 6(a) is finished After the data storage into the RAM 22 is perfected, data modulation on the CTL signal is started frame by frame. Because 9000 frames (5 minutes) are required for sending out one-scene data, the storage of the next scene into the RAM 22 is conducted in any field of the last frame in which data are sent out.

In the following, the encoder portion 25 and the modulator portion 26 for forming data stored in the RAM 22 according to the recording format are described.

The both portions operate with the leading edge of the recording CTL signal as reference timing. As described above, 3 duties (that is, falling timing) are given to the modulator portion 26 based on 4 kinds of data (data "0", "1", synchronizing signal "0", "1") from the encoder portion 25 and form as a CTL signal 12 output. Because one frame corresponds to about 33.37 ms, the leading edge of the recording CTL signal 11 makes the CTL signal rise up soon. Then, the CTL signal 12 is made to fall down by data from the encoder portion 25 after 18.4 ms in the case of data "0", after 25.0 ms in the case of data "1" or synchronizing signal "0" and after 9.2 ms in the case of synchronizing signal "1", respectively.

The encoder portion 25 feeds data (containing synchronizing data) one by one for each frame according to the order of the data as shown in FIG. 2.

After synchronizing signal "1", synchronizing signal "0" and address data of 6 bits (in which all bit data are "0" because the line address value is 0) are sent out for each frame after one scene is stored as described above, the encoder portion 25 makes reading access to the RAM 22 to fetch data of the RAM address 0. The fetched 4 bits are sent out in order. When the sending-out of the 4 bits is finished, the encoder portion 25 makes access to the RAM address to send out 4 bits one by one in order. After the aforementioned operation repeated till 4 bits in the RAM address 43 is sent out, 16 bits of error detection/correction code (for example, CRC code) are sent out as the next frame. The block as described above is a block of the line address 0. In the next frame, synchronizing signal "1" of the next block (address value 1) is sent out. Similarly, synchronizing signal "0", address data of 6 bits (in which the LSB is "1" and other bits are all "0"), 4 bit data of the RAM address 44, . . . are successively sent out. When 16 bits of CRC are sent out after 4 bits of the RAM address 87 are sent out, the block of the line address 1 is perfected. The aforementioned operation is repeated till the block of the line address 44 is sent out. Thus, 9000 bits corresponding to one scene is recorded.

If the storage of the next scene into the RAM 22 is made simultaneously in one field of the last frame in the block of the line address 44, the next one-scene data can be recorded by returning the operation to the start of the aforementioned paragraph. The operation of fetching video signal as a still picture during recording at intervals of a predetermined period (5 minutes) and superposing the signal as digital data on the CTL signal for the predetermined period (5 minutes) is repeated.

During the sending of bit data, an error-detecting-/correcting code is calculated by suitable producing means from the total 182 bits of address data 6 bits and picture element data 44×4 bits contained in one block, so that the thus obtained code is sent out lastly in the block. In this embodiment, 16 bits of CRC (cyclic redundancy check) code are used for the single purpose of error detection. For example, the following producing polynomial recommended by CCITT can be used.

$$G(x) = x^{16} + x^{12} + x^5 + 1$$

In the following, the operation of recording (hereinafter referred to as "PLAY-REC") of the index video signal $V_{IDX}$ in the reproducing mode of the VTR is described.

Figure 8:
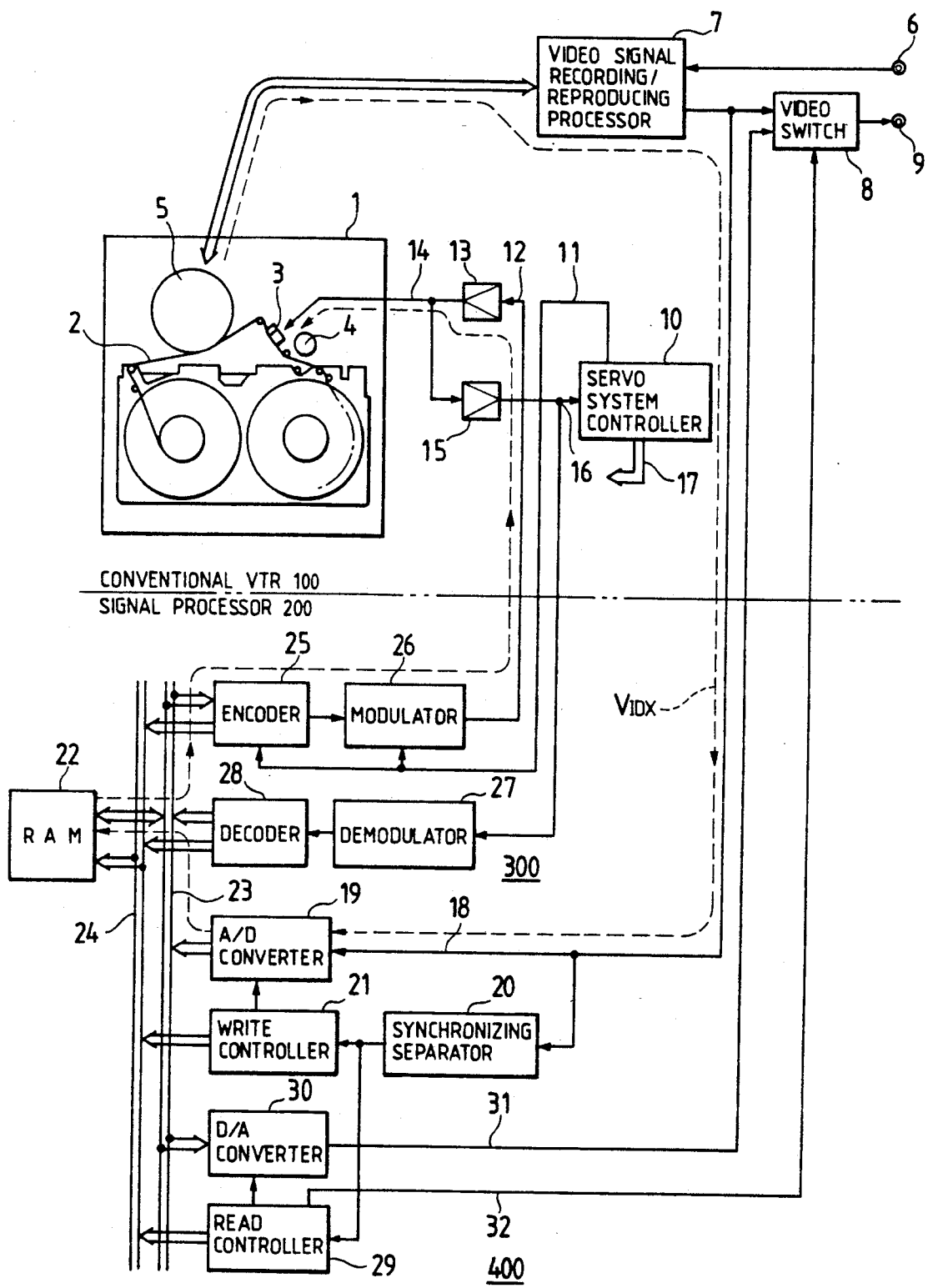
FIG. 8 is a block diagram for explaining the operation at the time of the PLAY-REC operation.

The outline of the operation is now described. The outline of the flow of main signals at the time of the "PLAY-REC" operation is shown in FIG. 8. As shown in FIG. 8, the video signal reproduced from the video tape 2 by the rotary head mechanism 5 is sent out to the video switch 8 through the video signal recording/reproducing processing circuit 7 and is branched. Then, the signal is digitally coded as a video signal 18 by the A/D converter portion 19. The data of the video signal 18 are once stored in the RAM 22 through the data bus line 23. Then, the data of the video signal is read from the RAM 22, converted in a predetermined format by the encoder portion 25 through the data bus line 23, superposed on the CTL signal 12 after modulation in the modulator portion 26, passed through the CTL recording amplifier 13 and the connection cable 14 and recorded on the control track of the video tape 2 through the stationary head 3.

In the following, the "PLAY-REC" operation is described more in detail.

The "PLAY-REC" operation can be established on condition that a certain video signal has been recorded on the video tape but no picture data is superposed on the control track. If after-recording of the index video signal $V_{IDX}$ is made on the video tape 2, the function of this embodiment for displaying the index video signal $V_{IDX}$ at the time of FF/REW can be added.

In the ordinary reproducing mode PB of the VTR, the video signal 18 of the video signal recording/reproducing processing circuit 7 in FIG. 1 is a reproducing video signal from the video tape 2. The picture data to be recorded is stored in the RAM 22 after the video signal 18 is subjected to A/D conversion by the A/D converter portion 19. Then, a necessary data train is formed from the video signal by the encoder portion 25. Then, a necessary duty ratio is given corresponding to the data by the modulator portion 26 in the same manner as in the "REC-REC" mode.

In the case of the ordinary reproducing mode PB of the VTR, the leading edge of the CTL signal 12 must be at least reproduced at the first step for the purpose of tracking. The timing thereof must accord with the recording CTL signal 11 which is a timing reference signal for the encoder portion 25 and the modulator portion 26. Accordingly, it is necessary to lead in the ordinary reproducing tracking servo previously to the recording of the index video signal $V_{IDX}$, confirm the stability thereof and perform the switching in the recording/reproducing frame of the CTL signal 12 that the CTL reproducing amplifier 15 and the CTL recording amplifier 13 are made active and inactive, respectively, in a period before and after the rising pulse of the reproducing signal and that the activities of the amplifiers are reversed in other periods. The switching signal (not shown) for the switching can be generated by the servo system control portion 10 or modulator portion 26. Of course, this is a consideration necessary in the case where the recording and reproducing of the CTL signal 12 are constituted by using one head commonly (as in almost VTRs). If the stationary head 3 is configured so as to provide recording and reproducing separately (or provide after-recording separately) or if the index video signal $V_{IDX}$ is recorded on another independent track without multiple modulation of the index video signal on the CTL signal in the control track, the aforementioned consideration is unnecessary.

In the case of the ordinary reproducing mode PB of the VTR, there are two points to be considered further. The first point is in the case where the leading edge in the reproducing CTL signal 16 becomes absent in the reproducing period during the recording of the index video signal $V_{IDX}$ after the reproducing period of the CTL signal 12 is determined. In this case, the recording of the CTL signal 12 is interrupted to perform re-tracking with the CTL signal 12 changed to continuous reproducing. The second point is in the case where the recording mode (recording time, for example, standard or three-fold) of the video signal on the video tape 2 is changed. Although disorder at the switching point can be eliminated by the consideration for the first point, CTL signal 12 pulses of three waves are reproduced in one frame at the switching point from the standard mode to the three-fold mode. If the phase of one wave of the three waves accords with the phase of the CTL signal 12 pulse in the standard recording portion, the signal cannot be detected. Accordingly, the problem can be solved by performing the reproduction of the CTL signal 12 in the period of one frame at suitable intervals (for example, 1 block = 6.7 seconds) during the standard mode reproduction and confirming that one reproducing CTL signal 16 exists.

In the following the operation of reproducing (hereinafter referred to as "FF/REW-PLAY") of the index video signal $V_{IDX}$ in the FF/REW mode of the VTR is described.

The outline of the operation is now described in the same manner as in the description for the aforementioned modes. The outline of the flow of main signals at the time of the "FF/REW-PLAY" operation is shown in FIG. 9. As shown in FIG. 9, the index video signal $V_{IDX}$ recorded on the control track of the video tape 2 is reproduced through the stationary head 3, passed through the connection cable 14 and the CTL reproducing amplifier 15, fed as a reproducing CTL signal 16 to the demodulator portion 27 and decoded through the decoder portion 28. Then, the decoded signal is stored in the RAM 22 again through the data bus line 23. On the other hand, the signal is read from the RAM and fed to the D/A converter portion 30 through the data bus line 23. After D/A conversion in the D/A converter portion 30, the signal is fed as a D/A converter output signal 31 to the video switch 8 so that the signal is given the to TV receiver set from the video signal output terminal 9. At this time, the contents of the index video signal $V_{IDX}$ are displayed in the form of a still picture on the TV screen. The detailed aspect of the display will be described later.

In the following, the "FF/REW-PLAY" operation is described more in detail.

In the case where the VTR mechanism 1 is in a mode in which the video tape 2 runs at a high speed and in a state in which no signal but video signal having deviated synchronizing signal frequency to make normal synchronization impossible in the TV receiver set can be obtained or in a state in which no video signal can be reproduced, that is, in the case of the FF/REW mode, the tape speed generally varies widely. This reason is that high-speed feeding is attained by driving a reel mount without driving the video tape 2 through the pinch roller 4 as in the ordinary recording/reproducing mode and, on the contrary, the winding diameter of the video tape 2 changes with the taking-up thereof to bring about the change of the tape speed. Accordingly, the period of the reproducing CTL signal 16 to be reproduced also changes.

Further, in general, the tape speed in the FF/REW mode in the case where the tape has been recorded in the standard mode is not different from the tape speed in the FF/REW mode in the case where the tape has been recorded in the three-fold mode. Accordingly, the period of the reproducing CTL signal 16 is different by three times. When the change of the winding diameter of the tape is added to this, the change of the period becomes more excessive. Therefore, a proposal of controlling the tape speed based on the rotational speed of the two reel mounts or the frequency of the reproducing CTL signal 16 to stabilize the tape speed to some degree has been made. However, the change of the period of the reproducing CTL signal 16 must be considered to about 1/200 as much as the one-frame period in the case of normal reproduction.

In FIG. 9, the reproducing CTL signal is amplified by the CTL reproducing amplifier 15 and then the output reproducing CTL signal 16 thereof is converted into square wave as the waveform (FIG. 2) of the recording CTL signal 11. As well known, the output of the stationary head 3 is produced in the form of so-called differential pulse of polarity according to the direction of inversion at the polarity inverting point of magnetization. Accordingly, the CTL reproducing amplifier 15 is constituted to have integral characteristic or to contain a flip-flop circuit (bistable trigger circuit) to be set/reset based on the polar pulse.

The demodulator portion 27 operates as follows. Data are settled corresponding to the duty ratio based on the reproducing CTL signal 16 in which the period changes widely. Accordingly, it is preferable to perform duty ratio measurement independently for each wave of the reproducing CTL signal 16. Therefore, the time $t_N$ from the leading edge of the reproducing CTL signal 16 having waveform as shown in FIG. 2 to the trailing edge thereof is measured. Then, the time $t_S$ from the falling to the rising is measured. During the measurement of the next $t_N$, the value of d is calculated from the measured values $t_N$ and $t_S$ by the equation:

$$d = t_S / t_N$$

in which d represents the value obtained by subtracting 1 (one) from the reciprocal of the duty ratio used in the description of modulation. Of course, the duty ratio may be calculated as follows.

$$\text{Duty ratio} = t_N / (t_N + t_S)$$

This is for simplification of calculation. The value related to the found duty ratio is compared with a predetermined judgment value, so that data (containing sync) are decided. As described above, the measurement of the time between the edges of the CTL signal 12 and the calculation/data-detection are made simultaneously. The decided data are transmitted to the decoder portion 28, successively. Above description is in the case where the tape running is in the forward direction (that is, FF).

When the tape running is reverse (that is, REW), the signal sequence is reversed. Accordingly, $t_S$ is measured first. When the next $t_N$ is measured, d is calculated as follows.

$$d = t_S / t_N$$

The decoder portion 28 operates as follows. The flow of the processing is, successively, (1) detection of block synchronizing signal, (2) storage of address and picture element data into the buffer memory, (3) error detection, (4) correction/compensation and (5) transfer to the display memory.

(1) Detection of Block Synchronizing Signal

The block synchronizing signal can be detected by checking the bit series of synchronizing "1" data and synchronizing "0" data from the demodulator portion 27. In this format, one "1" data exists in the block synchronizing portion and the other, 199 bits take the value of "0" ("1" or "0" in picture element data). If continuous synchronizing "1" data of 2 bits or more do not exist, the synchronizing "1" data can be considered to be not conventional index or address code, but block synchronizing.

(2) Storage of Address and Picture Element Data into Buffer Memory

When the block synchronizing signal is detected, the addresses (0 to 199) in the block of the following data can be decided. Accordingly, the data train is separated into the block addresses, 44 picture element data in the block, and CRC data. The addresses and the picture element data are stored in predetermined positions of the buffer memory.

(3) Error Detection

A cyclic arithmetic operation according to a predetermined producing formula is performed on the addresses, the picture element data and the CRC data. If there is no error, the block is considered to be valid. If there is any error, the block is considered to be invalid.

(4) Correction/Compensation

If error bit can be specified on the error-detected block by an error detecting system, the error bit is corrected. If error correction is impossible, a compensating operation, for example, an operation of sending out again data in a block (line) just prior to the block, is performed.

(5) Transfer to Display Memory

The picture element data subjected to the aforementioned processing (4) are transferred to the RAM 22 through designation of the RAM addresses determined by the line number and the picture element number in the line. As a result, the displayed picture is updated successively.

Above description is applied to the case where the running direction of the video tape 2 is the forward direction (FF). In the reverse direction (REW), however, the data train is reversed. Accordingly, the address 199 in the block is given to the data next to the block synchronizing. Thereafter, the address number is decreased one by one. If writing in the buffer memory is designated based on the address in the block, new data enter in the reverse direction. In respect to the CRC calculation, the same arithmetic operation as in the case of the FF direction may be performed simultaneously because the block contains the same data as in the case of the FF direction. Alternatively, the arithmetic operation circuit (or software) may be replaced to perform a reversed-trace arithmetic operation for each bit of the reverse-direction data. It is a matter of course that the direction of correction is reversed.

The processing in the decoder portion 28 has been described in brief. In short, the procedure of successively encoding data stored in the RAM 22 at the time of recording to convert the data into a recording data train is performed reversely and, further, error correction/compensation is performed. Although the compensation in this description is made by substituting the just prior line for the error line, the buffer memory having the capacity for one line (block) is sufficient for such simple compensation. If no compensation is made, the buffer memory becomes unnecessary. If the interleaving of data (picture elements) is used in the recording format, fine compensation is made possible and, at the same time, introduction of error correction is made easy. In this case, the buffer memory requires the capacity corresponding to the interleaving distance.

These conditions are to be determined generally on consideration of factors, such as bit error rate from the step of modulation to the step of demodulation, statistical characteristic (random characteristic, burst characteristic) thereof, display picture quality and residual error tolerance, realization of the processing means, and the like.

In the following, the displaying operation by means of the reading control portion 29 is described.

The picture data reconstructed by the aforementioned decoding process have been transferred into the RAM 22. The object of the reading control portion 29 is to insert the contents of the reconstructed picture data as a reduced-scale display into the video output of the VTR. Although the outline of the reduced-scale display has been described above, the reduced-scale display will be described more in detail with reference to FIGS. 6(a) and 6(b).

The area surrounded by the one-dotted chain line is a subject of scale reduction on the original picture as shown in FIG. 6(a) because of the limitation of the number of the picture elements. The data which have been reproduced through the decoder portion 28 and other portions are transferred into the addresses of the same RAM 22 as in the storage state of the index video signal $V_{IDX}$ at the time of recording. For the purpose of performing scale-down display of the data stored in the RAM 22 as shown in FIG. 6(b), it is necessary to count up the value (0 to 1979) of the counter for generating the read-out address of the RAM to thereby make the count value of the counter accord with the display area and increase the clock frequency to the scale-down rate (4 in this embodiment).

The reading control portion 29 further has a delay circuit for giving a time (line number in the V direction ) from the synchronizing signal to the starting of scale-down display both in the horizontal (H) direction and in the vertical (V) direction, and a display period counter for generating signals for expressing the display period of 44 clock pulses (10 μs) in the H direction and the display period of 45 lines in the V direction. The conjunction or logical product of the two display period signals in the H and V directions forms a display area signal, that is, a switching control signal 32. If the time to the starting of the display in the delay circuit is changed, the position of the scale-down display portion in the video signal in FIG. 6(b) can be changed suitably.

The counter for generating the read-out address of the RAM 22 is designed to be reset at the starting point of the display area and to be counted in the period in which the display area signal is active. The counter takes the value from 0 to 43 in the first line display period (10 μs). In the next line, the value of the counter is counted up from 44 to 87. In the last line, the value of the counter is started from 1936 so that the display of one still picture is perfected in the last picture element of 1979. The aforementioned displaying operation is repeated in each field of the video signal 18 of the video signal recording/reproducing processing circuit 7.

Figure 6B:
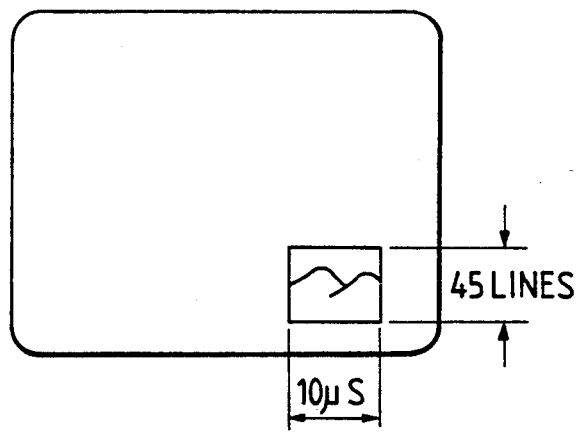
FIG 6(b) is a diagram for explaining the form of scale-down picture display at the time of FF/REW.

Further, the reading control portion 29 may generate a picture frame signal related to the generation of the display area signal to thereby add a frame to the peripheral of the scale-down display screen in FIG. 6(b). For example, the picture frame signal is constituted by an extension portion formed by extending the display area by two lines both in the upward direction and in the downward direction and by two picture elements both in the left and in the right. The picture frame signal may be constituted so that the video level (arbitrary level from black to white of the frame portion applied to the switching position added to the vide switch 8 can be selected based on the picture frame signal to be led to the video signal output terminal 9. Alternatively, the picture frame signal may be constituted so that the output of the D/A converter portion 30 gives the level of the frame based on the picture frame signal and that the ORing of the picture frame signal and the switching control signal 32 is made.

The D/A converter portion 30 serves to convert digital data into analog voltages to shape up the signal capable of being switched and inserted into the video output signal through the suitable limitation of the band. The output signal is the D/A converter output signal 31.

In the following, the switching control circuit 32 is described supplementarily.

Description about the writing of data into the RAM 22 and the reading of data from the RAM 22 has been made. In the case where access to the RAM 22 is made through the data bus line in the block construction as shown in FIG. 1, attention must be paid to competition for access, in particular, between the writing of the index video signal and the reading of still-picture data from the RAM 22 as a display memory.

There arises no problem in the recording mode. Of the 9000 frames, the number of frames capable of being subjected to reading access from the RAM (frame / field) 22 is 44×45=1980 frames (once per frame). Accordingly, of the 9000 frames, the room of 1 field for performing writing access into the RAM exists.

In the reproducing mode and FF/REW, in respect to the display area, the RAM data must be read and transferred to the D/A converter portion 30. On the contrary, the writing transfer for transferring reproduction-decoded data into the RAM 22 must be considered to occur randomly because of the change of the tape speed. In short, there is a possibility that a request for writing data in the RAM 22 may be issued while data is read from the RAM 22 during the display.

As a countermeasure, the clock period (1.1 MHz→0.9 μs) during the display may be divided to make it possible to perform both the writing in the RAM 22 and the reading from the RAM 22 substantially in parallel. Alternatively, as another countermeasure, the period of 10 μs of reading access from the RAM 22 may be defined as a writing-disabled period in which the transfer of data from the decoder portion 28 to the RAM 22 is deferred temporarily.

Memory chips used as the RAM 22 can be determined generally by factors, such as easiness of picture element construction control, and cost, inclusive of the aforementioned processing methods. In this embodiment, the highest speed is required for the reading period for displaying. However, the reading period is no more than 0.9 μs. Accordingly, a general purpose dynamic RAM can be used though refreshing control is required. In the point that control is simple and easy to handle, an SRAM (static RAM) may be used.

In the following, the states of the respective parts are described in the case where the VTR of this embodiment is used practically.

If there is no index video signal $V_{IDX}$ superposed on the CTL signal 12 and recorded in advance, it is a matter of course that the object of the present invention cannot be attained. The multiple recording of data is constructed so that still-picture data are automatically superposed by the running of the tape based on the following operations of the VTR:

(i) During execution of recording based on reservation or manual operation;

(ii) The case where the fact that index video signal $V_{IDX}$ data are not multiplexed is judged in reproducing operation; and (iii) The case where a mode (a kind of reproducing mode) for after-recording index video signal $V_{IDX}$ is operated.

Paragraphs (ii) and (iii) show methods for after-recording data on a video cassette on which data containing no index video signal $V_{IDX}$ has recorded by a conventional recording method. If the index video signal $V_{IDX}$ is recorded on the cassette, the index signal which has been recorded is destroyed. Accordingly, it is preferable that an operating portion for performing after-recording is provided as shown in paragraph (iii). In the mode of paragraph (iii), after-recording can be made easily in the period of no use of the VTR by providing automatic mechanisms, such as a mechanism for prohibiting the reception of other operations, a mechanism for returning the tape to the top thereof and then starting after-recording, a mechanism for automatically rewinding the tape and cutting off the electric source of the VTR when executing the running of the tape to the end thereof, or the like.

Although description has shown that the storage of the index video signal $V_{IDX}$ into the RAM 22 is executed just after the mode of the VTR is turned to the recording mode or after the execution is deferred for the period of several seconds in which the conventional index signal may be recorded, and the data are slowly superposed on the CTL signal 12 for the period of 9000 frames (5 minutes) so that the next index video signal $V_{IDX}$ is stored repeatedly when the superposing of the index video signal is finished, the index video signal may be restored in the following cases to re-start the recording of 9000 frames eve in the middle of the data recording of 9000 frames:

(i) The case where the recording or reproducing mode is once canceled and then set again;

(ii) The case where pause (waiting) is given in the recording mode and then recording is re-started;

(iii) The case where index or address information is recorded; and (iv) The case where an instruction is given to restore a still picture by manual operation.

Reproduction of Still Picture Data . . . FF/REW

In general, the VTR is constituted so that the input video signal is led to the output terminal in the period other than that time of the ordinary reproducing mode PB. In the ordinary reproducing mode PB, it is a matter of course that the reproducing video signal is sent out. The term "input video signal" means a signal selected from the line input from the outside and the video signal received by the built-in TV tuner FIG. 6(b) shows the condition that a reproducing still picture is inserted into the selected video signal. As described above in the operation in FIG. 1, a synchronizing signal must exist in the output video signal 18 of the video signal recording-/reproducing processing circuit 7 for the purpose of inserting the still picture. Accordingly, the video signal recording/reproducing processing circuit 7 has a function for generating a synchronizing signal (which may contain suitable video signal . . . for example, blue) instead of the input video when the input video does not exist.

Assuming that the FF or REW operation is given to the VTR, when the picture on the basis of the video signal from the output terminal 9 is watched on the TV screen, the scale-down display area as shown in FIG. 6(b) appears in some display. The picture in the scale-down display area is blank in the initial stage. When the running of the video tape is started, the decoding process and the transfer of the display data into the RAM 22 as described above are executed corresponding to the running of the tape, so that the picture in the display area is gradually perfected. The term "gradually" means the fact that data (contents of the picture) enter from left to right in a certain line of the 45 lines in the case of the FF operation so that a data next to the right end of the line enters into the left end of a line under the line. A line next to the lowermost line enter as the uppermost line of the next still picture so that data are updated downward. In the case of the REW operation, the reproducing data (picture element) train is reverse. Accordingly, updated data enter from left of a line to right so that a data next to the left end of the line enter into the right end of a line above the line. A line next to the uppermost line enter as the lowermost line of the just prior still picture (with respect to the time axis at the time of recording) so that data ar updated upward.

In this embodiment, the updating rate is one picture per five minutes. Assuming now the FF/REW speed is 50 times as high as the recording speed, the updating of one picture (45 lines) is made in the period of 0.1 minutes = 6 seconds. In the portion recorded in the three-fold mode, one picture is updated in the period of 2 seconds.

Consequently, because display as described above is made according to this embodiment, still picture data are updated downward as shown in FIG. 10 at the time of the FF operation and, on the contrary, still picture data are updated upward as shown FIG. 11 at the time of the REW operation. Accordingly, so-called vertical wipe switching can be attained, so that the direction of the running of the tape can be found. Because the real time required for drawing one still picture is a value of 5 minutes with no fraction, the quantity of the running of the tape can be found in an analog sense from the number of updated still pictures and the updated position of one still picture at the time of the FF/REW operation. A function that "the contents of the tape running at the time of the FF/REW operation can be known in the form of a picture by the same operation as in the conventional VTR as a first object of the present invention can be attained.

Second Embodiment

The aforementioned first embodiment is arranged such that an index video signal $V_{IDX}$ to be recorded is stored into an RAM 22, and after encoded the signal is recorded on a video tape 2, so that in the FF/REW mode, the signal is reproduced from the video tape again and transferred into the RAM 22 again after decoded, and the address of the RAM 22 is returned to the original address as a display memory, thereby reproducing a still picture.

On the other hand, the second embodiment is arranged such that the index video signal $V_{IDX}$ data stored in the RAM 22 are not passed through the course of the encoder portion 25, the modulator portion 26, the stationary head 3, the demodulator portion 27 and the decoder portion 28 (in other words, without moving the data on the RAM 22 at all) so that the index video signal $V_{IDX}$ data stored in the RAM 22 are used as they are for scale-down display. This is realized by using the RAM 22 commonly for the double purpose of writing the index video signal $V_{IDX}$ data and reading the data from the RAM 22 as a display memory and by providing the same relation in the addresses.

The limitation of access in competition between the writing and the reading still remains. If specific consideration is not given, access for scale-down display cannot be made in the field period in which the index video signal $V_{IDX}$ is stored. However, this brings about no functional disorder, specifically.

The objects of the second embodiment are in the following points.
(i) When the mode of the VTR is changed from the REC mode to the pause or stop, one scene of the video signal (recording video) immediately before the change of mode is stored as the index video signal $V_{IDX}$ in the RAM 22, so that the scale-down display of the index video signal $V_{IDX}$ is continuously made during the pause or stop period. In short, still picture display is made.
(ii) When the mode of the VTR is changed from the ordinary reproducing mode (PB mode) to the stop mode, one scene of the video signal (reproducing video) immediately before the change of mode is stored as the index video signal $V_{IDX}$ in the RAM 22, so that the scale-down display of the index video signal $V_{IDX}$ is continuously made during the period of the stop mode.

In short, in this embodiment, scale-down display is not made in the REC or ordinary reproducing mode PB, and one-field still picture storage (with no display) is executed when the mode of the VT is changed from the aforementioned mode to the mode in which the running of the tape stops, whereafter the state of display is switched to the state of scale-down display. The video output in the state in which the running of the tape stops is a selected input signal (the aforementioned line input, tuner input or all blue) and the contents of the video signal are progressed if any input exists. In the conventional VTR, what the last scene in the REC is or where the tape is stopped in the ordinary reproducing mode PB must be known by human memory or actual reproduction of the tape. According to the present invention, the recording scene or reproducing scene at the point where the tape is stopped is stored as a still picture and inserted as a scale-down display in the recording video signal. Accordingly, the picture at the current position of the stopping tape can be displayed to facilitate the handling of the VTR to shift the necessary mode soon. In particular, in the case of edition recording, the end scene of the recording tape can be displayed. Accordingly, the state of connection with a scene to be recorded after the end scene can be confirmed by one TV display to facilitate the edition recording.

When the aforementioned function is combined with the still picture display (the first embodiment) in the FF/REW operation, a function that "when the output video scene of the VTR is different from the scene at the current position of the tape, the scene at the current position of the tape can be displayed as a scale-down scene" is attained.

In the prior art, the output video of the VTR does not accord with the contents of the tape, except (1) during the REC operation and (2) during the PB operation containing special reproduction. According to this embodiment, the contents of the tape at the current position of the tape can be always displayed as a picture in all the operations of the VTR (even in the state of the running of the tape) with no special operation.

Accordingly, the picture contents at the current position of the tape can be always seen with no change of the handling properties of the conventional VTR. Furthermore, searching through the picture in the FF/REW operation can be attained though the searching is impossible in the prior art. Consequently, a large effect and improvement can be attained in that connection in the contents of the tape can be confirmed by eyes during the edition of the tape.

APPLIED EXAMPLE

Although the aforementioned embodiments have been shown as examples of the present invention, it is to be understood that the present invention is not limited to those specific embodiments thereof and that all changes and modifications may be made in the present invention without departing from the spirit and scope thereof.

In the following, applied examples of the present invention are disclosed.

Construction and the Like

As described above, the present invention is not limited by the format of the VTR. The invention can be applied to the case where the format of the VTR is out of the VHS type as long as a stationary head can be used.

It is to be understood that the block diagram shown in FIG. 1 may be divided or integrated suitably as long as the same function can be attained, and that either analog processing or digital processing may be used. Further, in the case where digital processing is used, the aforementioned procedures may be described by software of a computer (micro-computer) and executed by the computer.

In particular, the modulator portion 26, the demodulator portion 27, the encoder portion 25 and the decoder portion 28 can be used sufficiently (though transmission bit rate is related) if the computer is constituted by a micro-processor capable of executing relatively high-speed processing.

The A/D converter portion 19 and the writing control circuit 21, and the D/A converter portion 30 and the reading control portion 29, inclusive of the RAM 22, may be replaced by a conventional, so-called picture-in-picture apparatus, because the aforementioned scale-down scene insertion and display method is allied to that used in the conventional picture-in-picture apparatus. In this case, the arrangement of picture elements cannot be determined freely. Of course, the VTR according to the present invention can be reconstructed so that the function according to the present invention is added to the picture-in-picture function. In the case where the VTR according to the present invention is reconstructed based on the conventional picture-in-picture circuit, the VTR is reconstructed so that data transfer between the added encoder, the decoder and the RAM can be executed smoothly with no competition of access to the RAM for the conventional picture fetching and display.

Modulation/Demodulation

In the aforementioned embodiment, data are superposed on the CTL signal by the change of the duty ratio. Although the embodiment has shown the case where three kinds of duty ratios, data "0", data "1" and synchronizing, are defined, the present invention can be applied to the case where four or more kinds of duty ratios may be defined. Assuming that four-value data (0, 1, 2, 3) are used, then data of 2 bits can be placed on one frame (one CTL) to increase transmission rate by twice. Of course, when eight-value data are used, data of 3 bits can be placed on one frame. However, the width of the change of the duty ratio decreases as duties increases in kind, so that difficulty increases for the purpose of demodulating correct data according to the change of the tap speed.

Although amplitude modulation is not impossible, a risk of interfering the original CTL increases in the case of amplitude modulation.

If stationary head tracks other than the control track can be used, the transmission bit rate (the quantity of information) can be increased greatly. Although audio based on the stationary head is essential as "normal audio", VTRs mounting "Hi-Fi audio" based on FM have been popularized and the fact that the necessity of normal audio is lowered is undeniable. If there is a thought that the present invention is used for other purposes, displayed picture quality can be improved greatly by use of the present invention. For example, the recording bit rate of about 1 kbit/sec or more can be realized easily by use of a relatively simple modulating-/demodulating method such as bi-phase modulation. Because the recording bit rate in the CTL multiplex in this embodiment is 30 bit/sec, the quantity of information is increased by 30 times or more. As the tape speed changes widely at the time of FF/REW, it is preferable that a modulating method easy in reproduction of clock (data delimiter) in demodulation and in sampling of data is used. Bi-phase modulation is one method which satisfies such a requirement. Because magnetization is always inverted at each data delimiter and further inverted in the center of the period of data "1", data clock can be sampled so easily that digital demodulation can be constituted easily. The method is suitable for magnetic recording because the direct- current and low-band contents of modulated wave are sufficiently small.

Format

In the aforementioned embodiment, CTL multiplex is employed as a data recording method on the consideration that it is the safest method. On the contrary, there arises a limitation of data rate. As described above, the CTL multiplex can be used in practice on the limitation of the performance level as follows: (1) monochrome, (2) 44×45 picture elements, (3) 4 bits per picture element, and (4) updating period 5 minutes.

However, there is a room for improvement in the aforementioned four points. Therefore, a method of saving the number of bits to be transmitted or a method of increasing the transmission bit rate is required. Of course, the two methods may be used in combination.

The increase of the transmission bit rate has been described above. As the quantity of information increased by 30 times or more can be attained if there is a certain not-CTL multiplex but exclusive channel, ample improvement in the four points can be attained as the effect thereof.

Remarkable improvement of the performance, such as (1) color, (2) 192 picture elements (containing color data)×64 lines, (3) 5 bits per picture element, and (4) updating period 1 minute.

Even in the case of CTL multiplex, the data rate can be increased by twice with the use of 4-value modulation. In short, the CTL multiplex can be used for improvement of the performance such as color, and updating period 3 minutes.

The term "saving the number of bits to be transmitted" means "high-efficient coding". On the basis of the statistic characteristic of a picture, bits are concentrated into the changing portion. For example, data for expressing differential coding, estimation coding and statistic characteristic are transmitted. For example, a method of Hadamard transformation has been known. However, the picture transmitted according to the present invention is not a moving picture but an individual still picture. Accordingly, an information quantity compressing method based on the correlation between frames (fields). The degree of compression is to be discussed on the consideration of deterioration of picture quality caused by the compression.

Although the arrangement of recording data obtained by the encoder is shown in FIG. 2, interleaving means generally used with error correcting/compensating means are not yet mentioned. As well known, the effect of correction/compensation can be improved by dispersing the arrangement of data against concentrated (burst) error in the transmission line according to a rule so that the burst error can be dispersed when data are returned to the original arrangement. Accordingly, the judgment whether such interleaving should be used or not and what change of the arrangement is given is related to the length of estimated burst error in the transmission line. For example, in the case of CTL multiplex, the fact that data rate is low means the fact that recording wavelength on the tape is long. The probability that reproducing waveform is disordered by a scratch or the like of the tape is low. Accordingly, the effect of interleaving is not large. However, in the case where data rate is increased by borrowing the normal audio track, it is necessary to pay attention to the fact that the probability of concentration of error increases as the data rate increases, that is, as the recording wavelength decreases.

Of course, such thought about interleaving is also necessary for determining the capacity of error detection/correction/compensation.

Although the recording data train in the aforementioned embodiment contains picture element data, synchronizing required for blocking, address and CRC, an auxiliary data area may be provided to contain information such as still picture number, recording date, time, other recording conditions/states, and so on.

Display Form

Although the aforementioned embodiment has shown the case where a scale-down picture is inserted in the output video signal of the VTR, it is a matter of course that a picture without reduction of the scale thereof may be substituted for the output video signal. In this case, means for indicating the substitution should be used.

Although the aforementioned embodiment has shown the case where the scale-down displayed picture is updated in the form of wiping in downward order at the time of F and updated in upward order at the time of REW, the present invention is applied to the case where the picture may be exchanged with a next picture instantaneously after the next picture is perfected. In this case, the displayed picture does not change before the picture is exchanged with the next picture. Accordingly, the quantity of running of the tape cannot be found as analog quantity, but there arises a merit in that the display is stable. If the degree of perfection of the picture currently subjected to processing is indicated by some display, the analog quantity of running of the tape can be known to some degree. For example, a bright spot may be displayed in the end (one side of the picture frame) of the display area so that a corresponding quantity of running of the tape in the unit of one still picture can be known by the movement of the position of the bright spot.

Although the aforementioned embodiment has shown the case where one scale-down picture is inserted and displayed, the present invention can be applied to the case where a plurality of scale-down display areas may be provided. In this case, the process of the displayed picture can be known by the plurality of pictures through the step of successively moving the area where the displayed picture is updated corresponding to the running of the tape.

Further, the area where updating is made may be set in an end area in the plurality of areas so that the pictures in the respective areas are successively shifted with the updating. In this case, a newest picture can be always displayed in the end area in the plurality of areas. Because the connection of the areas accords with the time series of the picture, the process is easy to understand. Of course, the area where updating is made at the time of FF and the area where updating is made at the time of REW are provided opposite to each other in the connection of the display areas. The display areas may be arranged horizontally or may be arranged vertically. Of course, the display areas may be arranged both horizontally and vertically, though the capacity of the RAM for display and the display reading control of the RAM increase.

The aforementioned display movement is generally called "scroll". Although description has been made in the case where the scroll is made for each picture (area), the present invention can be applied to the case where such (up and down) scroll may be made more finely for each line so that the scroll becomes more smooth as an analog quantity. To scroll the picture laterally, the block of the data format is constituted by vertically arranged picture elements rather than laterally arranged picture elements like lines. In short, the display form sometimes has an influence o the determination of the data format.

The conventional index or address code may be detected in the mode of reproducing the still picture in the present invention (FF or REW mode). As described above, when the VTR portion issues a CTL recording signal together with index/address information, the modulator portion 26 and the encoder portion 25 in FIG. 1 defer their operations and feed the CTL recording signal of the VTR mechanism 1 directly to the CTL head. Accordingly, the conventional index/address information can be detected in the CTL signal 16.

In general, the VTR is designed to operate only in the case where index/address searching is started. However, the still picture displaying apparatus in the present invention can be constituted so that a character/symbol for expressing the presence of the index/address code and a numerical value for expressing the value of the address are displayed.

In the aforementioned embodiment, one block is constituted by 200 bits. One address code is constituted by 92 bits as shown in FIG. 6(b). In short, the address code is shorter than the block. Accordingly, even if the index/address code enters into the picture data, block error is not more than 2 (2 lines). However, about 7 lines must be used in the case where characters (or letters) are displayed in the display screen. If a number of four figures is displayed when the index/address code enters into the picture data, the display is effective for estimation for searching. The index or characters such as numerical characters can be attained by transferring a predetermined data pattern onto the RAM 22 based on information detected by the index/address detecting function of the demodulator portion 27 and decoder portion 28.

Of course, this function can be used widely for the purpose of transferring and displaying character/symbol patterns related to the general operations of the VTR as well as characters/symbols related to the index/address.

As described above, according to the present invention, an index video signal to be recorded based on the recording control circuit is stored as digital-coded data in the RAM, after encoded the stored signal is recorded on a magnetic tape, the signal is reproduced from the magnetic tape at the time of FF/REW, and after decoded the signal is returned to the analog signal again so as to be outputted in the form of a still picture. Accordingly, searching in the FF/REW mode can be made exactly, finely and speedily based on searching reference information which is provided in the form of a picture as visual data with no special operation for the searching. Further, the searching is made regardless of the rotary video head, so that there is no failure of the head caused by the searching.

What is claimed is:

1. A rotary video head type information recording/reproducing apparatus, for recording and reproducing a picture signal, in which a video tape runs while being in contact with a stationary head at a high speed so as to allow video searching of a portion of said picture signal during a fast-feeding/rewinding operation of said video tape relative to the speed of the tape while in contact with a recording/reproducing head during a recording/reproducing operation, said apparatus comprising:

a read/write memory for periodically storing at least one portion of said picture signal;

a recording control circuit for periodically recording said at least one portion of said picture signal on said video tape through said stationary head during said recording/reproducing operation; and a reproducing control circuit for reproducing said periodic recorded at least one portion from said video tape through said stationary head and for outputting said at least one portion during video searching as said recording/reproducing apparatus is performing a fast-feeding/rewinding operation, wherein during the fast-feeding/rewinding operation said recording/reproducing head is not in contact with said video tape.

2. An information recording/reproducing apparatus according to claim 1, in which said at least one portion reproduced through said stationary head is output by said reproducing control circuit in the form of a reduced-scale picture signal relative to the scale of the picture signal output during a recording/reproducing operation.

3. An information recording/reproducing apparatus according to claim 2, in which said at least one portion output from said reproducing control circuit is representative of said picture signal appearing on a portion of said video tape that would be in contact with a recording/reproducing head of the apparatus during a recording/reproducing operation.

4. An information recording/reproducing apparatus according to claim 3, in which said recording control circuit writes in said memory directly at least a portion of a picture signal immediately before the operation of said information recording/reproducing apparatus changes from a recording into a recording pause or stop operation, and writes in said memory at least a portion of a picture signal immediately before the operation of said information recording/reproducing apparatus changes from a reproducing operation to a stop operation.

5. An information recording/reproducing apparatus according to claim 4, in which said reproducing control circuit outputs said recording picture signal or reproducing picture signal immediately before the operation of said information recording/reproducing apparatus changes, when said information recording/reproducing apparatus is in the state of recording pause or stop.

6. An information recording/reproducing apparatus according to claim 2, in which said recording control circuit writes in said memory directly at least a portion of a picture signal immediately before the operation of said information recording/reproducing apparatus changes from a recording into a recording pause or stop operation, and writes in said memory at least a portion of a picture signal immediately before the operation of said information recording/reproducing apparatus changes from a reproducing operation to a stop operation.

7. An information recording/reproducing apparatus according to claim 6, in which said reproducing control circuit outputs said recording picture signal or reproducing picture signal immediately before the operation of said information recording/reproducing apparatus changes, when said information information recording/reproducing apparatus is in the state of recording pause or stop.

8. An information recording/reproducing apparatus according to claim 1, in which said recording control circuit writes in said memory directly at least a portion of a picture signal immediately before the operation of said information recording/reproducing apparatus changes from a recording operation into a recording pause or stop operation, and writes in said memory at least a portion of a picture signal immediately before the operation of said information recording/reproducing apparatus changes from a reproducing operation to a stop operation.

9. An information recording/reproducing apparatus according to claim 8, in which said reproducing control circuit outputs said recording picture signal or reproducing picture signal immediately before the operation of said information recording/reproducing apparatus changes, when said information recording/reproducing apparatus is in the state of recording pause or stop.

* * * * *